United States Patent [19]

Stayner et al.

[11] 4,113,525

[45] Sep. 12, 1978

[54] CARBOXYLIC ACID-CONTAINING WAX FLUXES

[75] Inventors: Robert A. Stayner, Lafayette; Richard C. Fox, San Rafael; Thornton K. Jones, Greenbrae, all of Calif.

[73] Assignee: Chevron Research Company, San Francisco, Calif.

[21] Appl. No.: 811,504

[22] Filed: Jun. 30, 1977

[51] Int. Cl.$^2$ .............................................. B23K 35/34
[52] U.S. Cl. ........................................ 148/23; 148/22
[58] Field of Search ..................................... 148/22–25

[56] References Cited

U.S. PATENT DOCUMENTS

| | | | |
|---|---|---|---|
| 3,944,123 | 3/1976 | Jacobs | 148/23 |
| 3,960,613 | 6/1976 | Stayner | 148/22 |
| 3,960,614 | 6/1976 | Stayner | 148/22 |
| 3,975,216 | 8/1976 | Stayner | 148/22 |
| 3,977,916 | 8/1976 | Stayner | 148/22 |

Primary Examiner—P. D. Rosenberg
Attorney, Agent, or Firm—D. A. Newell; C. J. Tonkin; J. J. DeYoung

[57] ABSTRACT

Wax-flux compositions for use in soldering processes comprising: (a) a major amount of a wax; and (b) an effective amount to cause fluxing, at or below the temperature of the piece to be soldered, of a wax-dispersible $C_{12}$ to $C_{28}$ aliphatic carboxylic acid.

6 Claims, No Drawings

CARBOXYLIC ACID-CONTAINING WAX FLUXES

BACKGROUND OF THE INVENTION

The invention relates to soldering and fluxes used in soldering processes.

Soldering is one of the oldest methods of joining two or more metal articles. Soldering involves the joining of metallic surfaces by flowing between them by capillary attraction alloys of lower melting point than the metals to be joined. The metal surfaces remain unmelted, but are solidly united when the solder alloy or solder metal solidifies.

Preparation of the joint surfaces is an important factor in soldering. With few exceptions, a flux composition is utilized. Fluxes are used to prevent the oxidation of the filler metal and of the surfaces of the metal being joined during the heating. The flux will also dissolve oxides which naturally exist on most metal surfaces as well as those that may form during the heating operation. Additionally, fluxes influence the surface-tension equilibrium in the direction of solder spreading.

Fluxes are applied to the metal surfaces to be soldered by many methods, for example brushing, spraying, dipping, etc. However, utilization of a liquid vehicle for application of the flux has many processes. For example, in the assembly of automotive radiators, the parts to be soldered are commonly dipped in a flux-containing bath. Dipping of the part has many disadvantages. First, it results in a large waste of material, since the entire part is coated with fluxing material rather than just the surface to be soldered; secondly, the solvent must be evaporated first before the soldering occurs, and this results in a loss of energy; thirdly, use of a solvent or water-based flux creates air pollution problems due to emissions of volatile constituents into the atmosphere.

The aforementioned problems can be overcome through utilization of a wax flux. Wax-flux compositions are known in the art and have been used in low-temperature soldering processes. See, for example, U.S. Pat. Nos. 3,977,916; 3,960,614; 3,960,613; 3,975,216; and 3,954,494, which discloses wax-flux compositions containing sulfonic acids. Wax-flux compositions avoid some of the prior art problems encountered with liquid fluxes in that the flux can be readily applied only to the surface to be soldered, thus avoiding waste of flux. Furthermore, the wax quickly solidifies so that the parts can be easily stored for future soldering.

Although wax fluxes are known in the art, there are many problems with various wax fluxes. For example, some wax fluxes tend to decompose during the soldering process and leave a residue which can effect the quality of the joint. Other wax fluxes tend to leave residues which interfere with subsequent soldering and/or painting of the soldered piece. Furthermore, in some fluxes, the fluxing agent tends to "weep" out of the wax during storage, which causes serious quality-control problems, particularly when the parts to be soldered are stored for any length of time with the wax-flux already applied. Another, unpredictable factor about wax fluxes is their ability to wet the metal pieces being soldered. Thus, all of the above factors must be considered when selecting a wax flux.

SUMMARY OF THE INVENTION

A wax-flux composition is disclosed, which comprises:

(a) a major amount of a wax having a melting point between 40° and 100° C; and (b) an amount effective to cause fluxing, at or below the soldering temperature of the piece to be soldered, of a wax-dispersible $C_{12}$ to $C_{28}$ aliphatic carboxylic acid.

DETAILED DESCRIPTION OF THE INVENTION

Wax-flux compositions for use in soldering processes are provided, comprising: (a) a major amount of a wax having a melting point between 40° and 100° C; and (b) an amount effective to cause fluxing at or below the soldering temperature of the piece to be soldered of a wax-dispersible $C_{12}$ to $C_{28}$ aliphatic carboxylic acid. The carboxylic acid-containing fluxes of this invention have been found to be highly effective as fluxing compositions. The $C_{12}$ to $C_{28}$ carboxylic acids are dispersed in the wax and do not "weep" out during storage and do not leave harmful residues after soldering.

The Wax

Suitable waxes for use in the wax-flux compositions of this invention include any wax or wax blend which is solid at room temperature and has a melting point below the temperature at which the soldering process will be conducted. Preferably the waxes have a melting point of at least 40° C and generally the waxes will have a melting point not greater than 100° C. Preferably the waxes have a melting point between 50° and 80° C. Melting points as used herein are determined by ASTM D87-66.

Suitable waxes include petroleum-derived waxes such as the well-known paraffin waxes, microcrystalline waxes, slack waxes, scale waxes, petrolatum, etc. These waxes are obtained from the processing of crude petroleum and are generally substantially saturated, substantially straight long-chain aliphatic hydrocarbons. Petroleum waxes suitable for use in this invention have melting points within the range specified above. Suitable wax blends for use in this invention include the hot-melt coatings which consist of blends of petroleum waxes and polymers, copolymers or resins. Suitable materials which may be blended with the petroleum waxes include polymers of low-molecular-weight olefins, such as polymers of ethylene, propylene, butylene, isobutylene, and the like. Suitable polymers will have molecular weights from about 1000 to about 1,000,000, more usually from about 1000 to about 50,000. These are average molecular weights, and generally a major portion of the molecules of the polymer will have molecular weights close to the average.

Suitable copolymers include copolymers of olefins with olefinic esters such as ethylene-vinyl acetate copolymers. These copolymers are commercially available. Other suitable copolymers include copolymers of propene and butene. Typically such a copolymer will contain from about 15 to about 85 mol percent propene, more usually from about 25 to 75 mol percent propene. Typical copolymer molecular weights will range from about 1000 to about 1,000,000, more usually from about 1000 to about 300,000.

Other suitable wax blends include wax compositions incorporating cellulose esters or cellulose ethers. Suitable cellulose esters include alkyl esters of cellulose wherein the cellulose molecule contains, on the average, 3 alkyl radicals per glucose unit, i.e., the cellulose esters are triesters of cellulose. Typically, the alkyl radicals contain from about 7 to about 16 carbon atoms, which include cellulose triheptanoate, cellulose trioctanoate, cellulose tridecanoate, cellulose trilaurate, etc.

Suitable waxes for this invention also include waxes obtained from natural sources, such as animal, vegetable or insect sources. Suitable waxes include beeswax, carnuba wax, montan wax, wool wax, and the like.

Another type of wax suitable for use in this invention includes the well-known Fischer-Tropsch waxes. Fischer-Tropsch waxes are waxes synthesized by the familiar Fischer-Tropsch process. By this process, coal is burned in the presence of oxygen and steam to produce hydrogen and carbon monoxide, which are then reacted in the presence of catalyst to make the desired hydrocarbon wax. Suitable Fischer-Tropsch waxes for this invention can be obtained under the trade name PARAFLINT. These particular Fischer-Tropsch waxes have a high molecular weight, on the average in the range of about 750 to 1000, and generally consist essentially of straight-chain hydrocarbons.

A further type of wax suitable for this invention comprises the solid polyethers having a molecular weight in excess of about 1000. Suitable polyethers include polyethylene glycol, polypropylene glycol, polybutylene glycol and the like. Furthermore, one or both of the terminal hydroxy groups may be replaced by an alkoxy group (capped) such as methoxy, ethoxy, and the like. Polyether copolymers are also contemplated, for example a copolymer of ethylene glycol and propylene glycol. These copolymers may have a random or block structure, or mixture thereof. The higher-molecular-weight polyethers are preferred, especially those of 4000 or more molecular weight. Such compounds are commercially available.

Although the above waxes have been mentioned individually, suitable waxes for this invention include mixtures of various proportions of the above-mentioned waxes.

The Fluxing Agent

The fluxing agents useful in the present invention are the aliphatic carboxylic acids containing 12 to 28 carbon atoms which are dispersible in the above-described waxes. The acids may be monobasic or polybasic, saturated or unsaturated, and may contain a hydroxyl substituent. Particularly preferred are the monobasic straight-chain saturated acids containing 14 to 20 carbon atoms.

Representative acids useful in the present invention are: lauric acid, tridecanoic acid, myristic acid, pentadecanoic acid, palmitic acid, heptadecanoic acid, stearic acid, isostearic acid, nonadecanoic acid, 12-hydroxystearic acid, eicosanoic acid, heneicosanoic acid, docosanoic acid, tricosanoic acid, tetracosanoic acid, pentacosanoic acid, hexacosanoic acid, heptacosanoic acid, octacosanoic acid. Particularly preferred is stearic acid, 1,12-dodecanedioic acid; 1,8-tridecanedioic acid; 4,6-pentadecanedioic acid; 1,18-octadecanedioic acid; and 1,28-octacosanedioic acid.

The Wax-Flux Compositions

The wax-flux compositions of this invention are prepared by melting the wax or wax blend and dissolving the carboxylic acid therein. The mixture is then stirred until homogeneity is obtained. The wax-flux composition is cast into blocks or slabs and allowed to solidify unless it is to be immediately used.

The wax-flux compositions of this invention will contain an amount effective to cause fluxing, at or below the soldering temperature of the piece to be soldered, of the above-described wax-dispersible acid or ester. This effective amount can readily be determined by those skilled in the art by a few simple soldering tests to determine the minimum amount necessary. Any amount above the minimum necessary to cause effective fluxing is generally not necessary and increases the cost of the wax-flux composition without additional benefits during the soldering process. Typically, the wax-flux compositions will contain from about 1 to about 50 weight percent of the fluxing agent, more usually from about 3 to about 30 weight percent, and preferably from about 5 to about 20 weight percent.

EXAMPLES

The suitability of the wax-flux compositions of the present invention is illustrated by the following examples. The solderability tests were done using a General Electric meniscograph, which provides a continuous record of the wetting process by measuring the push-and-pull on a specimen as it is partially immersed in molten solder. When a test specimen first enters a solder bath, before wetting occurs, the specimen floats on the solder and resists being pushed into the bath. After wetting occurs, the solder climbs the surface of the specimen, pulling the specimen toward the solder. The push-and-pull on the specimen is measured by a transducer, which produces a direct-current signal that is recorded. The total time of the test is limited to 8 seconds. With the output initially set at zero, the time required to return to zero after being partially immersed is defined as the "wetting time". Generally, the shorter the wetting time, the better the flux composition. Wetting times of about 2.5 seconds show some fluxing effectiveness, but very good fluxing agents give wetting times of less than 1.5 seconds.

Table I shows the wetting times of representative organic carboxylic acids of this invention, as measured by the meniscograph.

TABLE I

| Ex. No. | Carboxylic acid, wt.% | Wax[1] Melting point, °C | Time to set (sec.) |
|---|---|---|---|
| 1 | Stearic acid, 5, + 10% bromodecane | 68–69 | 0.88 |
| 2 | Stearic acid, 5, + 5% of 70% chlorinated wax | 68–69 | 1.25 |
| 3 | Stearic acid, 5, + 10% bromodecane | 68–69 | 0.88 |
| 4 | Stearic acid, 10 | 53.5–54.5 | 1.0 |
| 5 | Stearic acid, 20 | 53.5–54.5 | 0.9 |
| 6 | Stearic acid, 20 | 68–69 | 1.1 |

[1] A refined petroleum wax.

What is claimed is:

1. A wax-flux composition comprising:
    (a) a major amount of a wax having a melting point between 40° and 100° C; and
    (b) an amount effective to cause fluxing, at or below the soldering temperature of the piece to be soldered, of a wax-dispersible $C_{12}$ to $C_{28}$ aliphatic carboxylic acid.

2. The wax-flux composition of claim 1 wherein said wax has a melting point of 50° to 80° C° C.

3. The wax-flux composition of claim 2 wherein said acid is a saturated straight-chain carboxylic acid containing 14 to 20 carbon atoms.

4. The wax-flux composition of claim 3 wherein said acid is a monobasic acid.

5. The wax-flux composition of claim 4 wherein said acid is stearic acid.

6. The wax-flux composition of claim 4 wherein said acid is 12-hydroxystearic acid.

* * * * *